Nov. 10, 1925.

L. DRESNER

GLARE ELIMINATOR

Filed March 27, 1925

1,561,415

Louis Dresner
INVENTOR

BY Victor J. Evans
ATTORNEY

Patented Nov. 10, 1925.

1,561,415

UNITED STATES PATENT OFFICE.

LOUIS DRESNER, OF BRONX, NEW YORK.

GLARE ELIMINATOR.

Application filed March 27, 1925. Serial No. 18,882.

*To all whom it may concern:*

Be it known that I, LOUIS DRESNER, a citizen of the United States, residing at Bronx, in the county of Bronx and State of New York, have invented new and useful Improvements in Glare Eliminators, of which the following is a specification.

This invention relates to improvements in glare eliminators for motor vehicles.

The primary object of the invention resides in an attachment for the headlights of motor vehicles for eliminating the glare from the upper half of the headlight whereby the vision of a driver of an approaching vehicle or pedestrian is protected when looking into the headlight, but which permits a sufficient ray of light to be projected forward and downward upon the roadway.

Another object is to provide a head light attachment for completely enclosing an electric lamp and which may be quickly removed from the lamp should it be necessary to replace the lamp, or should the attachment in any way become damaged to necessitate a replacement.

A further object is the provision of a headlight attachment including a pair of hingedly connected sections, one of which is transparent and the other opaque, and which co-act to snugly enclose the electric bulb and which are held in co-acting position by a suitable attachment means.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1:
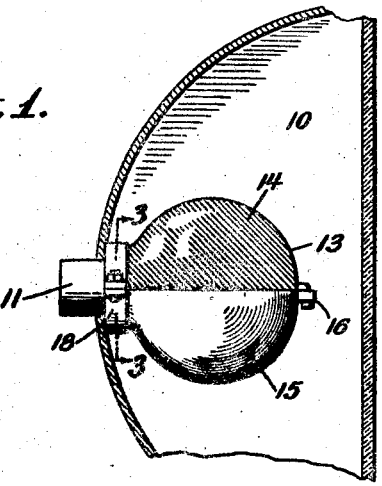
Figure 1 is a vertical sectional view through the headlight showing my invention in use thereon.
Figure 2:
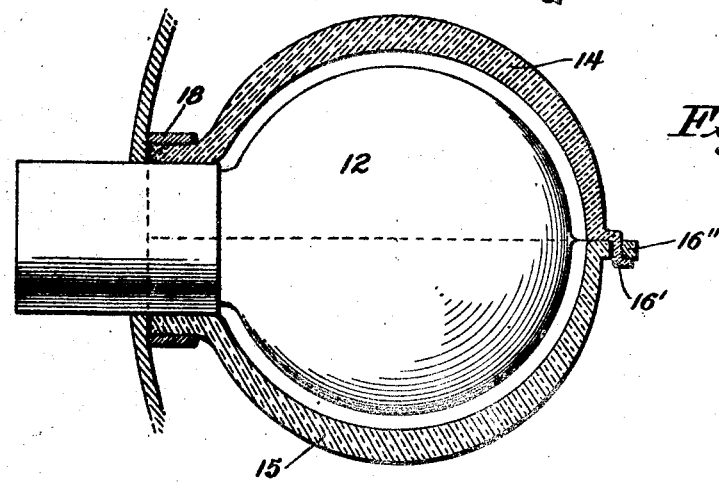
Figure 2 is an enlarged vertical sectional view.
Figure 3:
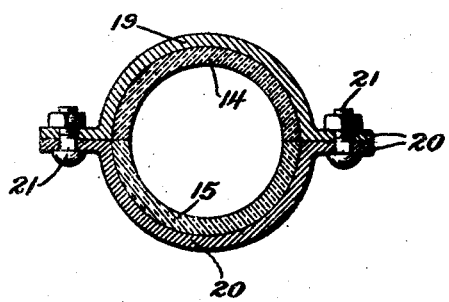
Figure 3 is a transverse sectional view on the line 3—3 of Figure 1.
Figure 4:
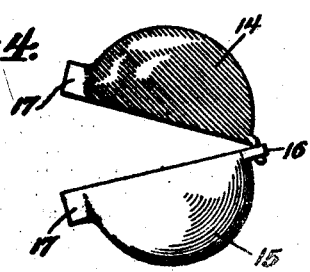
Figure 4 is a detail elevational view of my invention per se with the hinged sections in open position.

Referring more particularly to the drawing, the reference numeral 10 designates a headlight of the type employed on motor vehicles, and which includes a lamp socket 11 extending centrally through the rear wall of the headlight casing and which receives an incandescent electric lamp 12. My invention is shown in its entirety as at 13 and includes a pair of shell section 14 and 15 which are concavo-convexed in cross section and which are hingedly connected together as at 16. The shell sections are constructed of glass and the section 14 is opaque while the section 15 is transparent. Each section is formed with a neck portion 17 which snugly encircles the base of the electric lamp when the sections are in coacting position and are held in engagement therewith by clamping means 18.

The hinge 16 is separable and comprises co-acting parts 16' and 16" carried by the respective sections. The part 16' is in the nature of a tongue while the portion 16" is a lug having a slot through which the tongue passes. In the event that either of the sections become damaged the sections may be readily replaced by reason of the separable hinge.

The means 18 comprises a pair of semicircular parts 19 which are provided with outwardly extending ears 20 and when in alignment, the said ears receive securing elements 21 which pass therethrough.

When applying the attachment to a lamp, the sections 14 and 15 are swung about the hinge 16 to permit the bulb of the lamp to be inserted between the restricted neck portions, after which the sections are closed and the clamping means 18 applied to hold the sections in position about the bulb. When in position the opaque section 14 is disposed above the horizontal axis of the lamp whereby the light rays from the upper half of the headlight is dimmed as clearly shown in Figure 1 of the drawing. The transparent section 15 reflects the full strength of light rays from the lamp which is then projected forward and downward by the usual reflecting surface present in all types of headlights. It will thus be seen that the glare usually affecting the vision of the driver of an approaching vehicle or of a pedestrian is eliminated but the maximum amount of road illumination is retained.

From the construction shown, it will be readily apparent that my device may be easily applied to or removed from an electric bulb as the occasion demands, and the bulb and attachment inserted or removed from the lamp socket as a single unit.

While I have described what I deem to be the most desirable embodiment of my invention, it is obvious that many of the details may be varied without in and way departing from the spirit of my invention, and I therefore do not limit myself to the exact details of construction herein set forth nor to anything less than the whole of my invention limited only by the appended claims.

What is claimed as new is:—

1. A lamp attachment comprising a pair of separable shell sections, one of said sections being transparent and the other of said sections being opaque, co-acting means on one end of said members for hingedly connecting the same, neck portions formed on the other end of said sections, and clamping means encircling said neck portions for holding said sections in globular formation.

2. A glare eliminator for electric headlight bulbs comprising a pair of separable shell sections adapted to surround a bulb, one of said sections being transparent and the other of said sections being opaque, neck portions formed on one end of said sections and adapted to surround the neck of the bulb, a slotted lug formed on the opposite end of one of said sections, a tongue on the other of said sections and passing through the slot for hingedly connecting the sections together, and clamping means encircling said neck portions of the sections for holding the same in operative position about the neck of the bulb.

In testimony whereof I have affixed my signature.

LOUIS DRESNER.